United States Patent [19]

Rubio

[11] 4,389,067
[45] Jun. 21, 1983

[54] TAILGATE PROTECTING DEVICE

[76] Inventor: Arthur J. Rubio, 1505 De Rose Way, #10, San Jose, Calif. 95126

[21] Appl. No.: 224,633

[22] Filed: Jan. 12, 1981

[51] Int. Cl.³ .............................................. B62D 25/00
[52] U.S. Cl. .................................... 296/50; 224/310; 280/770; 296/61
[58] Field of Search .................. 296/3, 50, 51, 52, 53, 296/56, 57 R, 61; 280/762, 770; 410/77; 248/500, 201; 211/86; 224/310

[56] References Cited

U.S. PATENT DOCUMENTS

| | | | |
|---|---|---|---|
| 3,510,015 | 5/1970 | Roshaven | 296/61 |
| 3,527,371 | 9/1970 | Townsend | 224/310 |
| 3,698,760 | 10/1972 | Lane | 296/50 |
| 3,709,413 | 1/1973 | Nelson | 224/310 |
| 3,712,524 | 1/1973 | Ames, Jr. | 224/310 |
| 4,087,029 | 5/1978 | Shoemaker | 224/310 |
| 4,274,788 | 6/1981 | Sutton | 224/310 |

*Primary Examiner*—Joseph F. Peters, Jr.
*Assistant Examiner*—John A. Carroll
*Attorney, Agent, or Firm*—Claude A. S. Hamrick

[57] ABSTRACT

A tailgate protecting device including an elongated section of pipe or other rigid beam forming a structure which is long enough to span the width of the load carrying portion of a pickup truck, a pair of vertical support members affixed to the elongated beam proximate its ends, and a pair of laterally extending brackets for engaging the tailgate and holding the device in position. When in operation, the device is capable of supporting loads extending beyond the bed of the truck and over the tailgate, thereby protecting the tailgate from damage.

6 Claims, 4 Drawing Figures

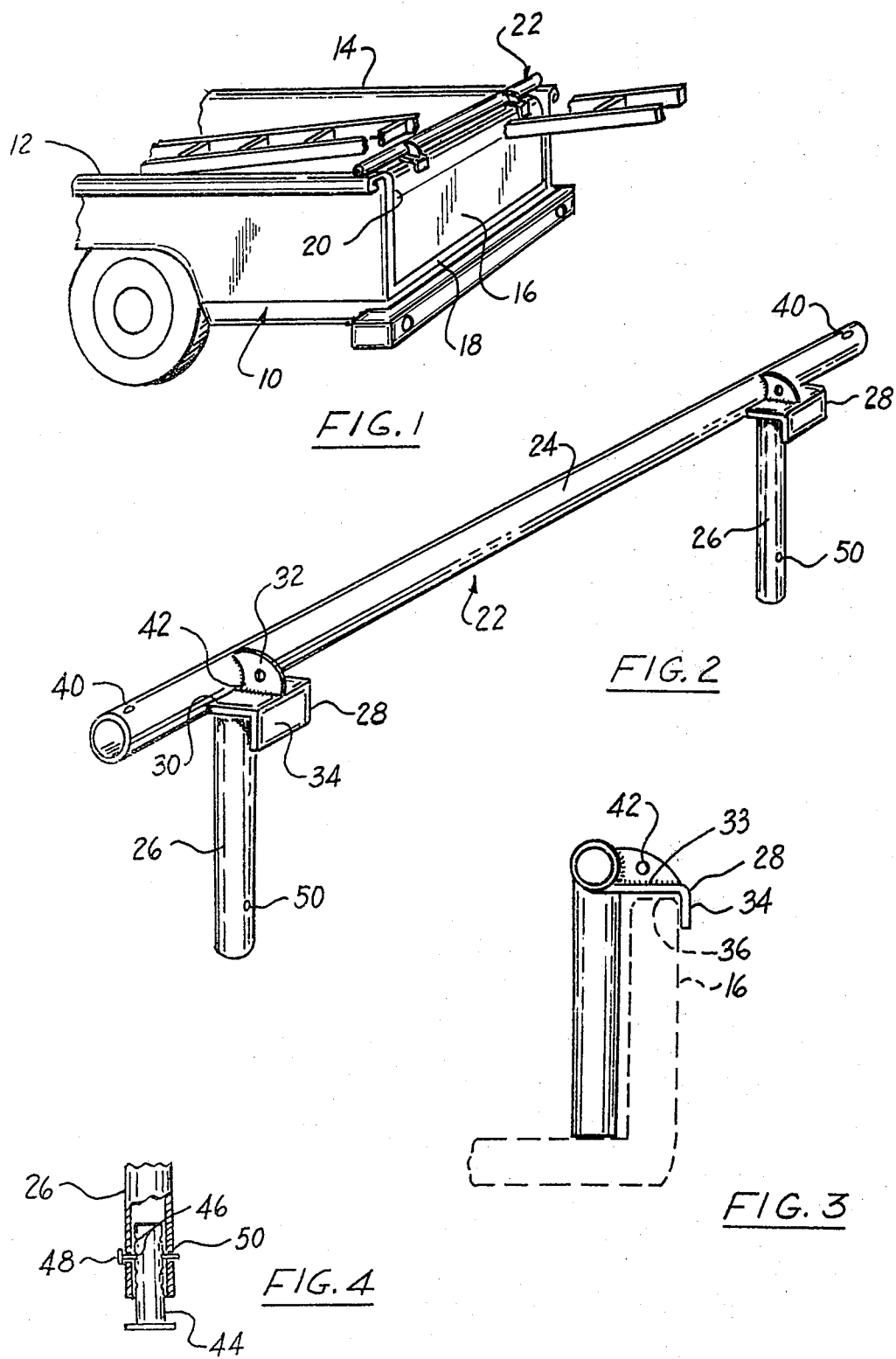

TAILGATE PROTECTING DEVICE

BACKGROUND OF THE INVENTION

1. Field of the Invention

The present invention relates generally to pickup truck accessories and more particularly to a novel device designed to protect the tailgate of a pickup truck from damage due to heavy loads carried thereby.

2. Description of the Prior Art

In the use of a pickup truck for general hauling and delivery, long items such as pipe, ladders, etc., are frequently carried by resting such items upon the tailgate in its raised position. Road conditions often cause these items to be jostled and bounced about so as to strike the top of the tailgate with relatively substantial forces. Consequently, the upper tailgate surface and sometimes even latches and hinges may be damaged because the tailgate is not designed to carry such loads.

SUMMARY OF THE PRESENT INVENTION

It is therefore a primary objective of the present invention to provide an accessory for use at the rear of a pickup truck in order to support long loads above the tailgate.

Another object of the present invention is to provide a device of the type described which can be quickly and easily installed.

Still another object of the present invention is to provide a device of the type described which is inexpensive to manufacture yet heavy duty in construction.

Briefly, a preferred embodiment of the present invention includes an elongated section of pipe or other rigid beam forming a structure which is long enough to span the width of the load carrying portion of a pickup truck, a pair of vertical support members affixed to the elongated beam proximate its ends, and a pair of laterally extending brackets for engaging the tailgate and holding the device in position. When in operation, the device is capable of supporting loads extending beyond the bed of the truck and over the tailgate, thereby protecting the tailgate from damage.

An advantage of the present invention is that it is simple in construction yet highly functional and relatively inexpensive.

Another advantage of the present invention is that it can be quickly and easily installed for use and can thereafter be simply lifted from its installed position and stored for later use.

These and other objects and advantages of the present invention will no doubt become apparent to those of ordinary skill in the art after having read the following detailed description of a preferred embodiment which is illustrated in the several figures of the drawing.

IN THE DRAWING

FIG. 1 is a partially broken perspective view illustrating the rear most portion of a pickup truck having a tailgate protecting device in accordance with the invention installed thereon;

FIG. 2 is a perspective view further illustrating a tailgate protecting unit in accordance with the present invention;

FIG. 3 is an end elevation of the unit illustrated in FIGS. 1 and 2 showing a truck tailgate in phantom; and FIG. 4 is a broken partial illustration showing an adjustable vertical support structure in accordance with an alternative embodiment of the present invention.

DETAILED DESCRIPTION OF THE PREFERRED EMBODIMENT

Referring now to FIG. 1 of the drawing, the rear portion of a pickup truck is shown at 10. This portion includes sidewalls 12 and 14 and a tailgate 16 hinged along its lower edge at 18 and latched at 20 by means not shown. Disposed above and slightly forward of tailgate 16 is a protective device 22 in accordance with the present invention.

As further illustrated in FIG. 2 of the drawing, the device 22 includes an elongated support beam 24 which may take the form of a cylindrical pipe, I-beam, box beam or other light weight structural member. Rigidly affixed to beam 24 proximate each end and extending vertically relative thereto are a pair of support legs 26 that are either bolted or welded to beam 24 at their upper extremities.

The length of beam 24 is selected to be approximately the same length as the outer width of truck sidewalls 12 and 14 while the lengths of legs 26 are selected to be substantially equal to or slightly larger than the depth of the load carrying compartment of the pickup truck. This is to say that although the ends of beam 24 are intended to rest upon the sidewalls 12 and 14 of truck 10, any load carried by beam 24 is to be supported primarily by the legs 26 rather than the sides of the truck.

Also affixed to beam 24 and extending laterally relative thereto are a pair of L-shaped flanges 28 which are welded to beam 24 at 30 and further include a stiffening web 32 which is welded to both flange 28 and beam 24.

Referring now to FIG. 3, the laterally extending length of portion 33 of bracket 28 is selected to be slightly larger than the width of the top edge 36 of tailgate 16 (shown in phantom) so that the downturned leg 34 thereof extends outside of tailgate 16 and holds the unit in place by sandwiching the top of the tailgate between the support legs 26 and the down-turned bracket legs 34 as illustrated in FIG. 3.

With the device in place as illustrated in FIG. 1, a load such as the ladder 40, shown partially broken away in FIG. 1, can be supported above tailgate 16 without causing damage thereto. For some applications, it may be desirable to bolt the subject device to the truck. One such application might be where the hauling is to be done over rural roads or cross country trails. In order to accommodate such fastening, holes 40 might be provided in each end of beam 24 for receiving bolts or other means for fastening the device securely to the sidewalls 12 and 14. In such applications, it may also be desirable to fasten the load to the supporting device, and accordingly, holes 42 might be provided in the stiffening webs 32 as indicated in FIGS. 2 and 3.

In order to make the device more or less universal so that it can be used in a variety of truck configurations, an adjustable foot 44 (FIG. 4) might be provided which is telescopically received within the lower end of each vertical support member 26. In order to make foot 44 adjustable, a plurality of holes 46 are provided for receiving an appropriate pin 48 which is inserted through holes 50 in the support members 26 and a selected set of the holes 46.

Where variations in width of truck bed are to be considered telescopic extensions similar to the feet 44 might be provided for each end of beam 24.

Although a single preferred embodiment of the present invention has been disclosed above, it is contemplated that additional alterations and modifications thereof will become apparent to those skilled in the art. It is therefore intended that the appended claims are to be interpreted as covering all such alterations and modifications as fall within the true spirit and scope of the invention.

What is claimed is:

1. A tailgate protecting device for pickup trucks, comprising:

an elongated horizontal support member forming a load carrying beam adapted to span the load carrying portion of a pickup truck and having a length such that each end extends over and rests upon the top of a side-wall of the truck;

a pair of vertical support members respectively affixed to said beam at predetermined distances from the ends thereof and forming load carrying legs the distal ends of which are adapted to rest upon the bed of the pickup truck; and bracket means affixed to said beam for extending over the top of the tailgate of the truck to hold said device in position immediately adjacent thereto without transmitting any vertical load carried by said beam to said tailgate, said bracket means including a pair of L-shaped members each having one leg which is affixed to beam and extends laterally relative thereto, and another leg which extends downwardly and cooperates with one of said support members to form a slot for receiving the top edge of the truck tailgate.

2. A tailgate protecting device as recited in claim 1 wherein said bracket means further includes a stiffening web affixed to said one leg of said L-shaped member and to said beam.

3. A tailgate protecting device as recited in claim 1 wherein each said vertical support member includes an adjustable foot means which allows the length of said leg to be selectively varied to accommodate differing truck sidewall heights.

4. A tailgate protecting device as recited in claim 3 wherein said legs are formed of tubular members and said foot means are telescopically received within the distal ends thereof, means being provided for selectively locking said foot means at particular extended positions relative to said legs.

5. A tailgate protecting device as recited in claim 1 wherein said beam includes means at each end for facilitating attachment to the sidewalls of a pickup truck.

6. A tailgate protecting device as recited in claim 2 wherein said beam includes means at each end for facilitating attachment to the sidewalls of a pickup truck and wherein said stiffening webs include means for facilitating the fastening of a carried load thereto.

* * * * *